Sept. 19, 1972  T. A. HALL  3,692,490

WATER TESTER FOR POOLS

Filed Oct. 23, 1970

INVENTOR.
THOMAS A. HALL.
BY
ATTORNEY.

United States Patent Office 3,692,490
Patented Sept. 19, 1972

3,692,490
WATER TESTER FOR POOLS
Thomas A. Hall, 3417 E. Sells Drive,
Phoenix, Ariz. 85018
Filed Oct. 23, 1970, Ser. No. 83,540
Int. Cl. G01n 1/14, 21/06, 33/18
U.S. Cl. 23—253 R                 8 Claims

ABSTRACT OF THE DISCLOSURE

An apparatus for checking the acidity, alkalinity and the chlorine content of pool water by simultaneously withdrawing into two separate containers predetermined samples from a given depth in the pool, simultaneously injecting into each sample a given amount of a different testing reagent, and simultaneously ejecting the water samples tested from each container after observing the test results.

BACKGROUND OF THE INVENTION

This invention relates to a new and efficient poolside tester for simultaneously testing the pool water for acidity, alkalinity and chlorine.

Field of the invention

This invention is directed to a tester for pool water which simultaneously withdraws predetermined amounts of water from a given depth in the pool into two containers, adds proper test reagents to each container, and ejects the test water after observation of the test results all automatically by a simple plunger action.

Description of the prior art

Heretofore kits for poolside water tests have merely involved a pair of test tubes which must be filled from an elbow length depth in the pool and to which must be added a predetermined number of drops of test reagents. Not only does this test involve the reaching below the surface of the pool for samples but the test is highly erratic because of the difficulty of gauging the size of the drops of the reagent added to the water to obtain consistent test results.

Attempts to mechanize these testing steps have resulted in complicated expensive equipment.

SUMMARY OF THE INVENTION

In order to insure that the pool water is properly protected and maintained to preserve a proper water balance the pool owner, among other things, must periodically check or test the acidity or alkalinity of the water hereinafter called its pH characteristic. This test is extremely important as it is responsible for the correct bacterial action of the chlorine. Incorrect pH can be responsible for staining or scaling of the pool's plaster or the corrosion of metal accessories such as pumps, ladders, grab rails, etc.

Chlorine tests are made to insure that enough chlorine is added to the water to maintain water purity. Chlorine level of the pool water is affected by the number of bathers, the water temperature, rain showers and high winds, sunlight, foliage, etc. The poolside test for chlorine should be made daily for proper water control.

The test reagents used for testing is Orthotolidine for chlorine and Phenol Red for acidity or alkalinity.

Orthotolidine when added to water containing chlorine turns the water various colors of yellow depending on the content of chlorine in the water. The darker the color the higher the chlorine content.

The addition of Phenol Red to the water sample turns the sample red, the color depending on the acidity or alkalinity of the water.

The stability of chlorine and its microbicidal activity are both pH dependent. Lower pH values cause a more rapid loss of chlorine, increasing the operating costs of the pool. Higher pH values retard the microbicidal activity of chlorine even though poolside tests may show its presence in the water.

Since a proper stability activity balance of chlorine in the water is essential to bacterial kill and since pH strongly influences this balance the pH must not be compromised by permitting it to change excessively.

Accordingly, it is necessary to regularly and accurately check the pool water for its acidity, alkalinity and chlorine content.

In accordance with the invention claimed a new and improved apparatus is provided for testing pool water which mechanizes the withdrawal of given samples of water from a given depth in the pool, injects into the samples a given amount of test fluid, and ejects the water samples after test.

It is, therefore, one object of this invention to provide a new and improved tester for pool water.

Another object of this invention is to provide a new and improved tester for pool water which is consistently accurate and requires no knowledge of the amounts of test fluid needed for individual and repeated tests.

A further object of this invention is to provide an easily operable device which is inexpensive to manufacture.

Further objects and advantages of the invention will become apparent as the following description proceeds and the features of novelty which characterize this invention will be pointed out with particularity in the claims annexed to and forming part of this specification.

DESCRIPTION OF PREFERRED EMBODIMENT

Figure 1:
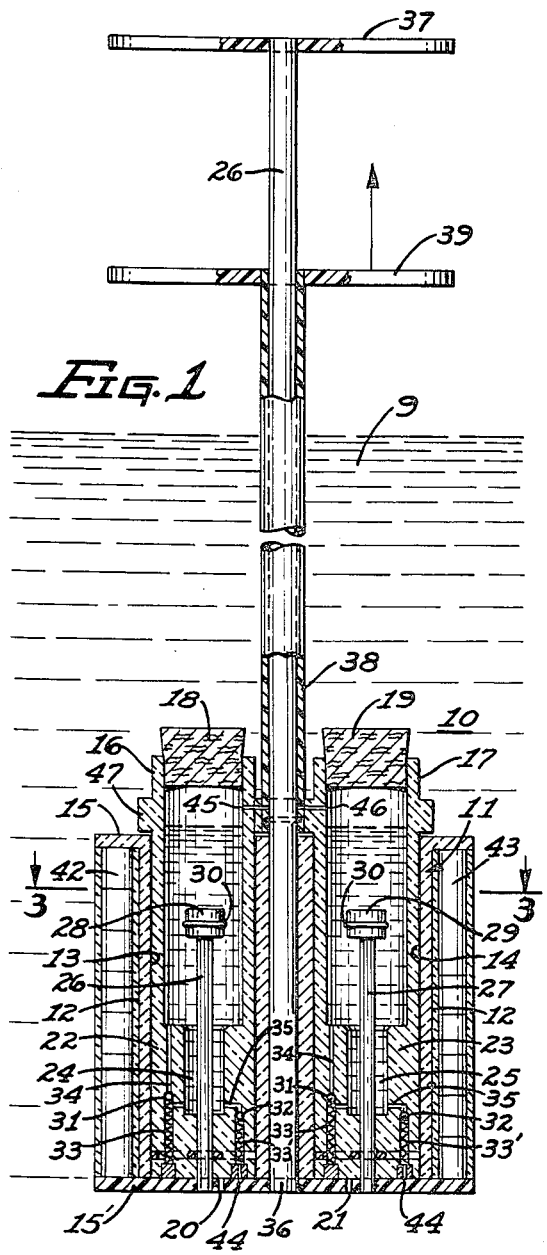
FIG. 1 is a cross sectional view of the pool tester ready for a pool water sample withdrawing operation and embodying the invention.

Referring more particularly to the drawing by characters of reference, FIGS. 1 and 2 disclose pool water 9 having a tester 10 shown in cross section below its surface. Tester 10 comprises an elongated rectangular housing 11 having rounded or arcuate sides 12 and defining cylindrical openings 13 and 14 extending longitudinally of the housing in side by side relationship through a top plate 15 to but not through a bottom plate 15' of the housing. A pair of cylinders 16 and 17 are slidably arranged to extend through top plate 15 into cylindrical openings 13 and 14. These cylinders are closed at their upper ends by corks or plugs 18 and 19, respectively. The lower end of each cylindrical opening is opened to the outside of housing 11 by ports 20 and 21. Metering blocks 22 and 23 are integrally arranged in the lower ends of cylinders 16 and 17 and are provided with metering openings 24 and 25, respectively.

Coaxially arranged with cylinders 16 and 17 and metering blocks 22 and 23 are metering rods 26 and 27. Rods 26 and 27 are fixedly attached at one end to bottom plate 15' of housing 11 and formed at their free ends with heads 28 and 29, respectively. Each head is provided with an O-ring 30 suitably fitted into a groove arranged around its outer periphery.

Metering blocks 22 and 23 are each provided with ball valves 31 and 32. Ball valve 31 of each metering block is provided with a spring 33 biased to a valve seated position which normally closes a port 34 extending between the inside of cylinders 16 and 17 and the lower portions of openings 24 and 25 in metering blocks 22 and 23. Ball valve 32 of the metering blocks 22 and 23 is provided with a spring 33' for biasing the valve to a valve seated position which normally closes ports 35 extending between the inside of openings 24 and 25 and outlets 44 in metering blocks 22 and 23.

Fixedly attached to base plate 15' between cylinders 16 and 17 is a rod 36 having a handle 37 at its free end. Coaxially and slidably arranged with it and fixedly attached at its lower end to a flange 47 integrally arranged with cylinders 16 and 17, is a movable sleeve 38 having a handle 39 at its free end. By drawing up handle 39 on sleeve 38 toward handle 37 on rod 36 cylinders 16 and 17 move upwardly in openings 13 and 14 in housing 11.

Figure 2:
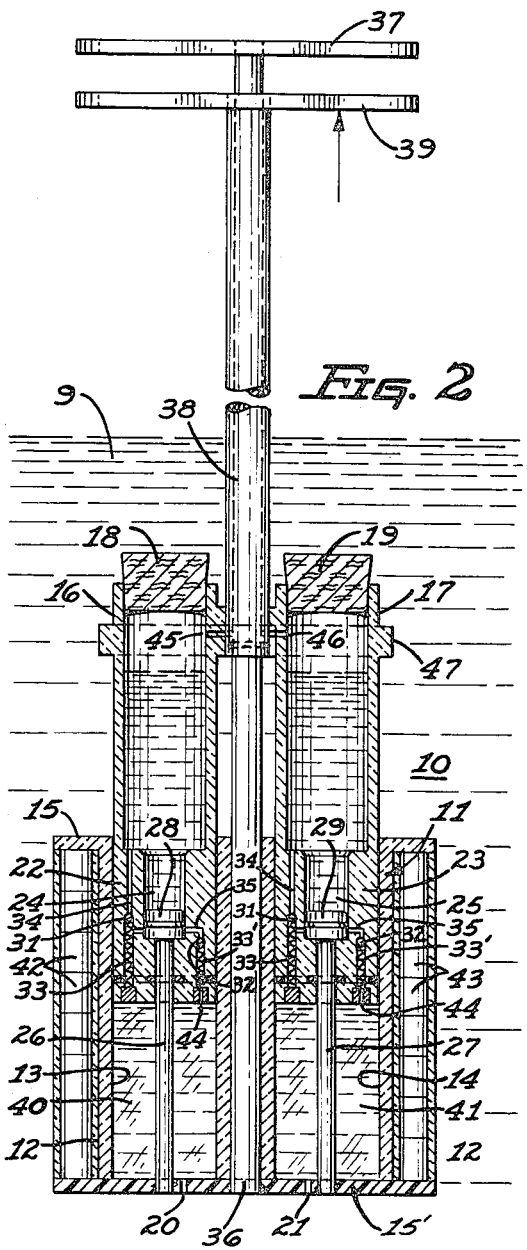
FIG. 2 is a cross sectional view similar to FIG. 1 with the pool water samples withdrawn into the tester.
Figure 3:
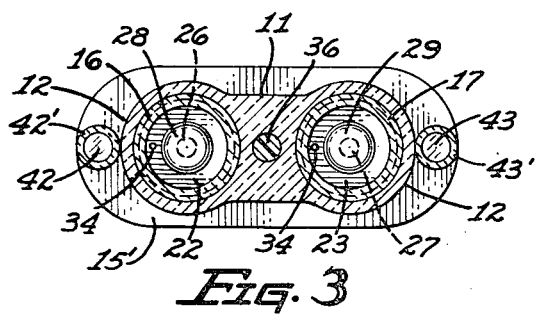
FIG. 3 is a cross sectional view of FIG. 1 taken along the line 3—3.

As shown in FIG. 2 when cylinders 16 and 17 are moved upwardly by sleeve 38 and handle 39 the cylinders move outwardly of housing 11 causing heads 28 and 29 of metering rods 26 and 27 to move into openings 24 and 25 capturing a given amount of reagent in each opening below the heads 28 and 29. This reagent is then forced out of openings 24 and 25 through ports 35 and outlets 44 into openings 40 and 41 in cylinders 16 and 17 below the metering blocks 22 and 23 as shown in FIG. 2.

The openings 40 and 41 in cylinders 16 and 17 have been previously filled with water samples from the pool through ports 20 and 21 by the withdrawing of cylinders 16 and 17 from the openings 13 and 14 in housing 11. Thus, the reagents in cylinders 16 and 17 are injected into the water sample drawn into the openings 40 and 41 by the upward movement of sleeve 38.

If the cylinders 16 and 17 are filled with Orthotolidine and Phenol Red, respectively, given amounts of these liquids will be injected into the water samples drawn into openings 40 and 41 in cylinders 16 and 17 causing the water samples to change color according to the acidity or alkalinity and chlorine content of the water.

Suitable color charts or blocks 42 and 43 are arranged in transparent cylinders 42' and 43' along the opening 13 and 14 for comparison purposes so as to determine the characteristics of the water samples. It should be recognized that at least a part of the walls defining openings 13 and 14 should be transparent in order to make this comparison test.

The ball valves 31 and 32 are provided in the metering block for aiding the movements of heads 28 and 29 into the openings 24 and 25.

During the sample withdrawing operation as the cylinders 16 and 17 are moved outwardly of openings 13 and 14 in housing 11, the compressed reagents in openings 24 and 25 below heads 28 and 29 will unseat the ball valves 32 aiding the heads 28 and 29 in entering the openings 24 and 25 and injecting the reagents into openings 40 and 41. During an ejecting operation after the tests have been completed, the downward movement of cylinders 16 and 17 will unseat ball valves 31 permitting the reagents in cylinders 16 and 17 to pass through ports 34 to the underside of heads 28 and 29.

Since operation of the tester will dispense reagents from cylinders 16 and 17, means must be provided for connecting the space above the reagents in cylinders 16 and 17 to atmosphere. This is accomplished by ports 45 and 46 which connect the inside of cylinders 16 and 17 to the space between coaxially arranged rod 36 and sleeve 38, as shown.

Although but one embodiment of the invention has been shown and described, it will be apparent to those skilled in the art that various changes and modifications can be made without departing from the spirit of the invention.

What is claimed is:

1. An apparatus for testing pool water comprising:
    a housing having a pair of cylindrical openings extending longitudinally of said housing, said cylindrical openings being closed at one end of said housing and opened at the other end,
    a pair of ports one extending from the inside of each of said cylindrical openings through the closed end of said cylindrical openings in said housing,
    a pair of metering rods one attached to the closed end of each of said cylindrical openings and extending longitudinally of said cylindrical openings toward their open ends, each of said metering rods having a piston type head mounted at its free end,
    a pair of open ended cylinders one slidably mounted in each of said cylindrical openings for movement longitudinally thereof, said cylinders fitting around said metering rods,
    a metering block arranged in and closing the inner end of each of said cylinders, said metering block defining an opening extending longitudinally therethrough for receiving in sliding arrangement therewith the metering rod, said opening being enlarged at the inner end of the metering block for receiving in tight fitting sliding arrangement the piston type head of the metering rod during movement of said cylinder out of its associated cylindrical opening,
    a second pair of ports, one in each of said metering blocks extending from the enlarged inner end of the metering block through said metering block toward the closed end of the cylindrical opening in said housing,
    means for closing the outer open end of each of said cylinders to contain reagents placed therein,
    means attached to each of said cylinders for simultaneously moving said cylinders out of said cylindrical openings thereby forcing said piston type heads of said metering rods into the enlarged openings at the inner ends of said metering blocks causing reagents trapped in said enlarged openings to be forced through the second port in each of said metering blocks into the closed ends of said cylindrical openings,
    the space in said cylindrical openings between said cylinders and said housing being filled with pool water drawn into said housing through said pair of ports when said cylinders are moved out of said cylindrical openings while said housing is submerged in pool water.

2. The apparatus for testing pool water set forth in claim 1 wherein at least a part of said housing defining said cylindrical openings is transparent.

3. The apparatus for testing pool water set forth in claim 1 wherein,
    a third port is provided in each of said metering blocks interconnecting the inside of the associated cylinder with the enlarged portion of said opening in said metering block,
    a first ball valve seated in said third port, and
    means for biasing said first ball valve to valve seated position to close said third port during movement of the cylinder out of its cylindrical opening in said housing and opening said third port during movement of the cylinder into the cylindrical opening in said housing.

4. The apparatus for testing pool water set forth in claim 3 wherein,
    a second ball valve is seated in said second port, and
    means for biasing said second ball valve to valve seated position to close said second port during movement of said cylinder out of the cylindrical opening in said housing and opening said second port during movement of said cylinder into the cylindrical opening in said housing.

5. The apparatus for testing pool water set forth in claim 1 wherein said means for simultaneously moving said cylinders out of said cylindrical openings comprises a pair of coaxially arranged tubular handles movable relative to each other, one of said handles being fixed to said housing and the other of said handles being fixed to said cylinders.

6. The apparatus for testing pool water set forth in claim 5 in further combination with means for venting said cylinders to atmosphere through a space between said tubular handles.

7. The apparatus for testing pool water set forth in claim 1 wherein said cylindrical openings are parallelly arranged in said housing.

8. The apparatus for testing pool water set forth in claim 2 in further combination with color charts mounted on said housing longitudinally thereof one on each side of said cylindrical openings.

References Cited

UNITED STATES PATENTS

| | | | |
|---|---|---|---|
| 3,449,081 | 6/1969 | Hughes | 23—253 |
| 3,518,804 | 7/1970 | Gerarde | 23—292 X |
| 3,615,240 | 10/1971 | Sanz | 23—259 |

MORRIS O. WOLK, Primary Examiner

E. A. KATZ, Assistant Examiner

U.S. Cl. X.R.

23—259, 292; 73—425.4 R; 141—27, 83